US012676571B2

(12) United States Patent
Ogawa et al.

(10) Patent No.: US 12,676,571 B2
(45) Date of Patent: Jul. 7, 2026

(54) NEAR-FIELD THERMAL RADIATION POWER GENERATION ELEMENT

(71) Applicant: Mitsubishi Electric Corporation, Tokyo (JP)

(72) Inventors: Shimpei Ogawa, Tokyo (JP); Masaaki Shimatani, Tokyo (JP); Shoichiro Fukushima, Tokyo (JP); Manabu Iwakawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/117,099

(22) PCT Filed: Nov. 15, 2022

(86) PCT No.: PCT/JP2022/042428
§ 371 (c)(1),
(2) Date: Mar. 31, 2025

(87) PCT Pub. No.: WO2024/105787
PCT Pub. Date: May 23, 2024

(65) Prior Publication Data
US 2026/0128706 A1     May 7, 2026

(51) Int. Cl.
*H02S 10/30* (2014.01)

(52) U.S. Cl.
CPC ................................... *H02S 10/30* (2014.12)

(58) Field of Classification Search
CPC ...................................................... H02S 10/30
See application file for complete search history.

(56) References Cited

U.S. PATENT DOCUMENTS

2009/0277488 A1 * 11/2009 Greiff ..................... H02S 10/30
136/200

FOREIGN PATENT DOCUMENTS

JP     2008-300626 A     12/2008
JP     2018-143025 A      9/2018

OTHER PUBLICATIONS

International Search Report and Written Opinion mailed on Feb. 7, 2023, received for PCT Application PCT/JP2022/042428, filed on Nov. 15, 2022, 8 pages including English Translation.

* cited by examiner

*Primary Examiner* — Tae-Sik Kang
(74) *Attorney, Agent, or Firm* — XSENSUS LLP

(57) ABSTRACT

Provided is a near-field thermal radiation power generation element in which the efficiency of power generation by near-field thermal radiation is improved by reducing a distance between a heat source and a photoelectric conversion unit as compared with that in a conventional case. A near-field thermal radiation power generation element includes a heat source, a photoelectric conversion unit, and a stopper. The heat source has a heat source surface. The photoelectric conversion unit has a photoelectric conversion unit surface facing the heat source surface. The stopper connects the heat source surface and the photoelectric conversion unit surface. A material for the stopper is a two-dimensional material.

16 Claims, 9 Drawing Sheets

Figures 6, 7, 8:
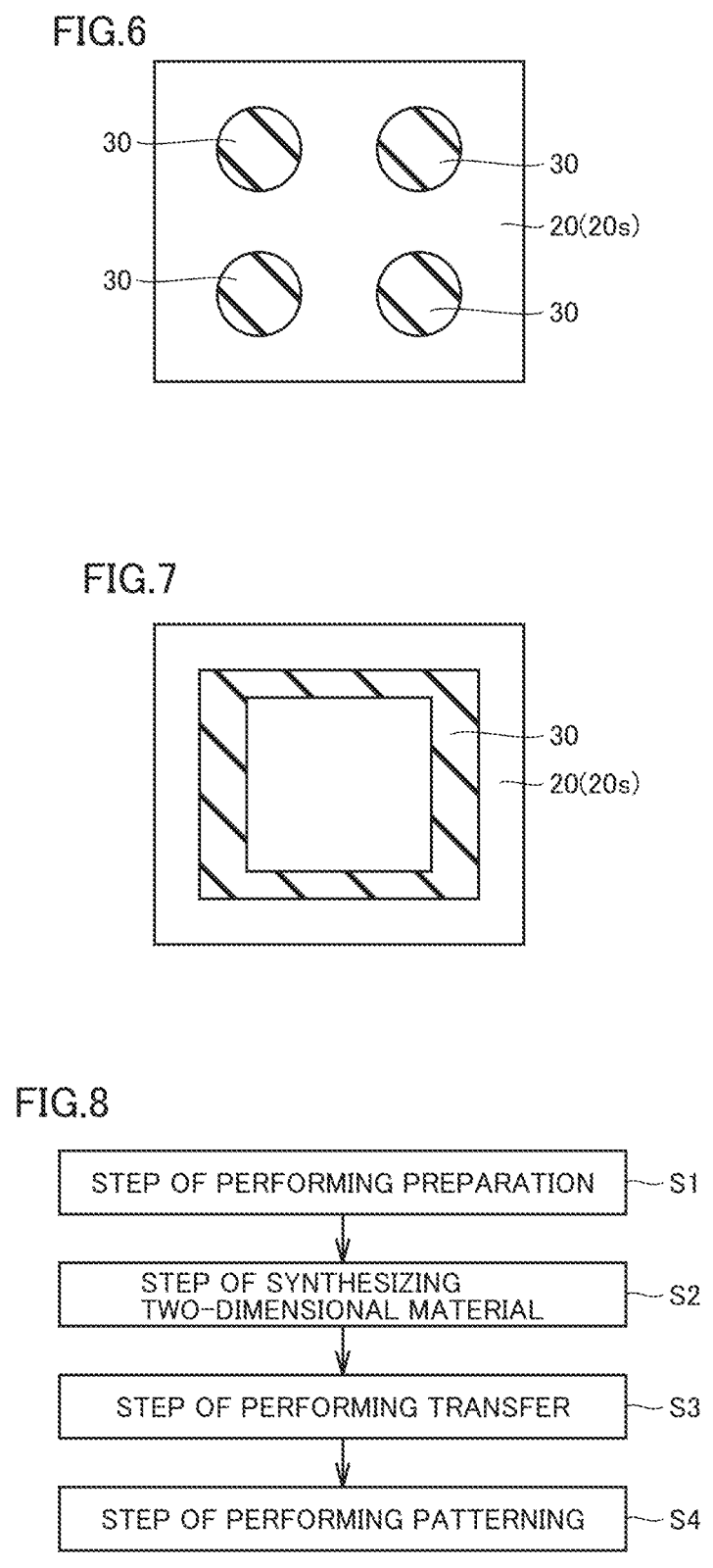

| STEP OF PERFORMING PREPARATION | S1 |

| STEP OF SYNTHESIZING TWO-DIMENSIONAL MATERIAL | S2 |

| STEP OF PERFORMING TRANSFER | S3 |

| STEP OF PERFORMING PATTERNING | S4 |

NEAR-FIELD THERMAL RADIATION POWER GENERATION ELEMENT

CROSS-REFERENCE TO RELATED APPLICATION

This application is a national stage application, pursuant to 35 U.S.C. § 371, of International Patent Application No. PCT/JP2022/042428, filed Nov. 15, 2022, the entire contents of which are incorporated herein by reference.

TECHNICAL FIELD

The present disclosure relates to a near-field thermal radiation power generation element.

BACKGROUND ART

In recent years, a power generation technique that utilizes near-field light existing in the vicinity of a surface of a heat source has attracted attention. In a photoelectric conversion unit that converts radiation heat produced by the near-field light into energy, more energy is obtained as the distance from a heat source is smaller. A conventional near-field thermal radiation power generation element includes an infrared radiation body, a power generation unit, and an actuator that maintains the infrared radiation body and the power generation unit at a predetermined distance (see, for example, Japanese Patent Laying-Open No. 2008-300626).

CITATION LIST

Patent Literature

PTL 1: Japanese Patent Laying-Open No. 2008-300626

SUMMARY OF INVENTION

Technical Problem

However, in a near-field thermal radiation power generation element as described above, the limit of a distance at which an infrared radiation body can be brought close to a power generation unit is as large as several 100 nm. Accordingly, it has been difficult to bring a photoelectric conversion unit as close as possible to a surface of a heat source where near-field light exists, and it has been difficult to further improve power generation efficiency.

The present disclosure has been made to solve problems as described above, and an object of the present disclosure is to provide a near-field thermal radiation power generation element in which the efficiency of power generation by near-field thermal radiation is improved by reducing a distance between a heat source and a photoelectric conversion unit as compared with that in a conventional case.

Solution to Problem

A near-field thermal radiation power generation element according to the present disclosure includes a heat source, a photoelectric conversion unit, and a stopper. The heat source has a heat source surface. The photoelectric conversion unit has a photoelectric conversion unit surface. The photoelectric conversion unit surface faces the heat source surface. The stopper connects the heat source surface and the photoelectric conversion unit surface. A material for the stopper is a two-dimensional material.

Advantageous Effects of Invention

According to the above, it is possible to obtain a near-field thermal radiation power generation element in which the efficiency of power generation by near-field thermal radiation is improved by reducing a distance between a heat source and a photoelectric conversion unit as compared with that in a conventional case.

BRIEF DESCRIPTION OF DRAWINGS

FIG. 6 is a cross sectional view showing a variation of the near-field thermal radiation power generation element according to the first embodiment.

FIG. 7 is a cross sectional view showing a variation of the near-field thermal radiation power generation element according to the first embodiment.

FIG. 8 is a flowchart of a method of manufacturing the near-field thermal radiation power generation element according to the first embodiment.

DESCRIPTION OF EMBODIMENTS

Figure 1:
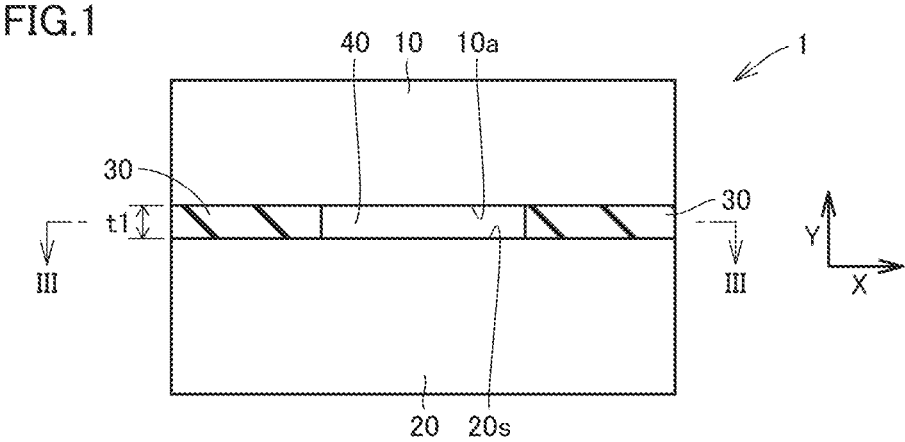
FIG. 1 is a cross sectional view of a near-field thermal radiation power generation element according to a first embodiment.

Hereinafter, embodiments of the present disclosure will be described. It should be noted that, unless otherwise specified, the same or corresponding parts will be designated by the same reference numerals in the following drawings, and the description thereof will not be repeated.

First Embodiment

<Configuration of Near-Field Thermal Radiation Power Generation Element>

Figure 2:
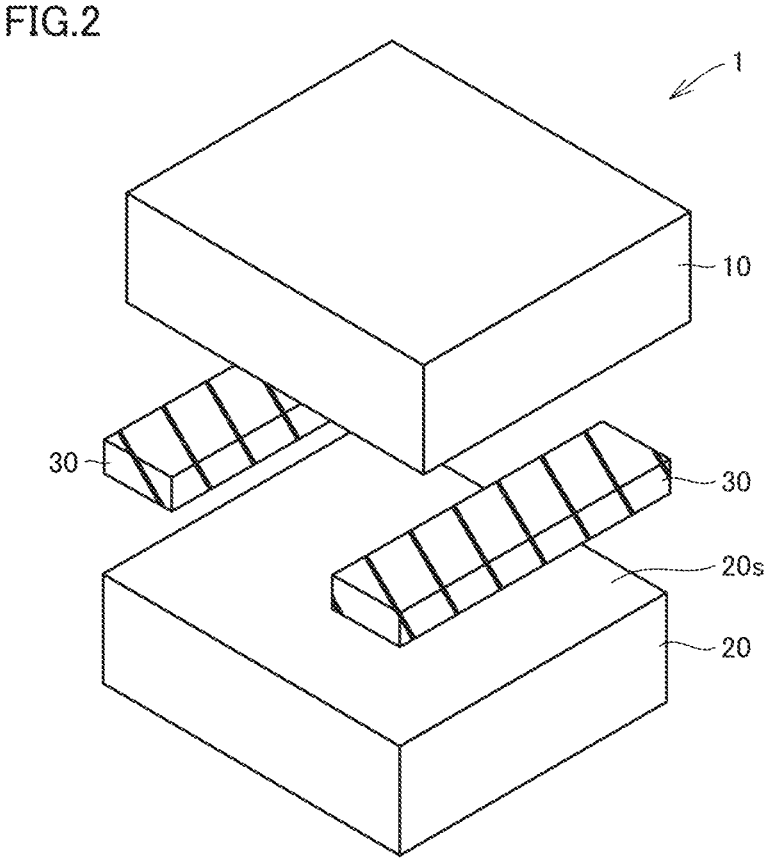
FIG. 2 is a perspective view in which components of the near-field thermal radiation power generation element according to the first embodiment are separated.
Figure 3:
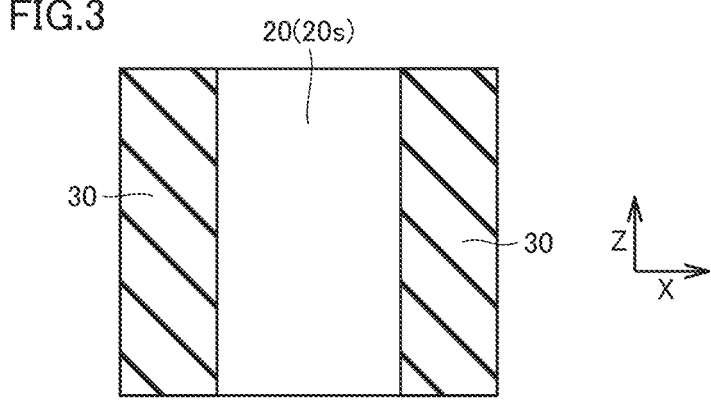
FIG. 3 is a cross sectional view taken along a line III-III in FIG. 1.

FIG. 1 is a cross sectional view of a near-field thermal radiation power generation element 1 according to a first embodiment. FIG. 2 is a perspective view in which components of near-field thermal radiation power generation element 1 according to the first embodiment are separated. FIG. 3 is a view of a cross section taken along a line III-III in FIG. 1, in plan view of near-field thermal radiation power generation element 1 as seen from a Y direction.

Near-field thermal radiation power generation element 1 shown in FIGS. 1 to 3 is near-field thermal radiation power generation element 1 for power generation, for example, and mainly includes a heat source 10, a photoelectric conversion unit 20, and a stopper 30. FIG. 2 is a view three-dimensionally showing near-field thermal radiation power generation element 1 according to the first embodiment, in which the components of heat source 10, photoelectric conversion unit 20, and stopper 30 are separated from each other. That is, FIG. 1 is a cross sectional view of near-field thermal radiation power generation element 1 including the components of heat source 10, photoelectric conversion unit 20, and stopper 30 connected in a stacking direction (the Y direction in FIG. 1), as seen from a Z direction. The Z direction is a direction perpendicular to each of the stacking direction (the Y direction in FIG. 1) and a flat direction (an X direction in FIG. 1). FIG. 3 is a cross sectional view of near-field thermal radiation power generation element 1, as seen from the stacking direction.

Heat source 10 has a heat source surface 10a. Photoelectric conversion unit 20 has a photoelectric conversion unit surface 20s. Photoelectric conversion unit surface 20s faces heat source surface 10a. Stopper 30 connects heat source surface 10a and photoelectric conversion unit surface 20s. Stopper 30 functions as a spacer that defines a distance between heat source surface 10a and photoelectric conversion unit surface 20s. A thickness of stopper 30 in the Y direction (the stacking direction) corresponds to the distance between heat source surface 10a and photoelectric conversion unit surface 20s. As shown in FIG. 3, two stoppers 30 are disposed at end portions of photoelectric conversion unit surface 20s. From a different point of view, two stoppers 30 are disposed with a spacing therebetween, with a central portion of photoelectric conversion unit surface 20s being sandwiched therebetween. Heat source 10 may be any substance having heat. Heat source 10 may be a device having a heat generation unit, a pipe, or a human body, for example.

Photoelectric conversion unit 20 may be any electromagnetic wave detector that converts energy obtained from an electromagnetic wave radiated from heat source 10 into electricity. For example, photoelectric conversion unit 20 may be an electromagnetic wave detector including a silicon substrate having a PN junction, an electromagnetic wave detector made of a compound semiconductor, or an electromagnetic wave detector using a thermocouple called a thermopile.

Here, near-field thermal radiation power generation element 1 according to the first embodiment is characterized in that a material for stopper 30 is a two-dimensional material. The two-dimensional material is a material having a thickness corresponding to a thickness of an atomic layer. Accordingly, by using a two-dimensional material as the material for stopper 30, a distance between heat source 10 and photoelectric conversion unit 20, that is, the distance between heat source surface 10a and photoelectric conversion unit surface 20s, is minimized.

The spectrum of the electromagnetic wave radiated from heat source 10 is determined according to Wien's law of radiation. Further, an electromagnetic wave having energy proportional to the fourth power of a surface temperature of heat source 10 is radiated from heat source 10, according to Stefan-Boltzmann law. When heat source 10 is a blackbody, heat source 10 has a radiation rate of 100%, and energy produced by radiation heat on this occasion is the maximum radiation energy. The energy at which the radiation energy is maximum is generally called a blackbody limit.

In a conventional technique, it has been difficult to extract energy exceeding the blackbody limit as radiation energy. However, in recent years, a technique that can extract energy exceeding the blackbody limit by utilizing near-field light has attracted attention. When a distance between a heat source and an electromagnetic wave detector is equal to or less than a wavelength of an electromagnetic wave radiated from the heat source, a surface of the electromagnetic wave detector suppresses reflection of the electromagnetic wave radiated from the heat source. Specifically, the distance between the heat source and the electromagnetic wave detector is preferably 1 μm or less. When such a condition is satisfied, energy exceeding the blackbody limit is obtained from the electromagnetic wave radiated from the heat source. This phenomenon is generally called near-field thermal radiation.

Due to the effect of the near-field thermal radiation, in near-field thermal radiation power generation element 1 according to the first embodiment, radiation energy produced by near-field light increases as the distance between heat source 10 and photoelectric conversion unit 20 serving as an electromagnetic wave detector is smaller. As shown in FIG. 1, a distance between heat source surface 10a and photoelectric conversion unit surface 20s in the Y direction is defined as a first distance t1. When first distance t1 is equal to or less than half to one third of an infrared wavelength, first distance t1 is a distance at which the effect of the near-field thermal radiation is obtained. In particular, as first distance t1 is smaller, the effect due to the near-field thermal radiation increases, and energy obtained by near-field thermal radiation power generation element 1 increases exponentially. Here, when the material constituting stopper 30 is a two-dimensional material, first distance t1 is conceivably the smallest as a dimension of a physical structure.

The two-dimensional material is a material having a thickness corresponding to the thickness of an atomic layer. Accordingly, the two-dimensional material may be referred to as an atomic layer material to emphasize the thickness of the atomic layer. As shown in FIG. 1, an atomic layer space 40 is a space formed between heat source 10 and photoelectric conversion unit 20 by stoppers 30 having the thickness of the atomic layer in the Y direction. With such a configuration, near-field thermal radiation power generation element 1 having atomic layer space 40 formed therein can obtain not only the blackbody limit, but also energy greater than energy obtained by utilizing conventional near-field thermal radiation, from heat source 10. That is, near-field thermal radiation power generation element 1 having atomic layer space 40 formed therein is a power generation element having the highest efficiency in principle.

The electromagnetic wave detected by photoelectric conversion unit 20 according to the first embodiment is visible light or an infrared ray, for example. It should be noted that the electromagnetic wave is not limited to visible light and an infrared ray. The electromagnetic wave may be light and an electric wave such as an X-ray, an ultraviolet ray, a near-infrared ray, a terahertz (THz) wave, and a microwave, for example.

The two-dimensional material as the material for stopper 30 according to the first embodiment is preferably an insulating material. In particular, boron nitride, which is an atomic layer material and has good insulating properties, is suitable as the material for stopper 30 according to the first embodiment. In particular, when the boron nitride is hexagonal (hexagonal boron nitride), it is lattice-matched to graphene. Accordingly, when the material for stopper 30 is hexagonal boron nitride and a material for a photoelectric conversion member 21 (see FIG. 9) described later in a second embodiment is graphene, the hexagonal boron nitride does not degrade characteristics of the graphene. Thus, the hexagonal boron nitride is suitable as the material for stopper 30.

The shape of stopper 30 may be changed as appropriate, as long as stopper 30 does not hinder formation of atomic layer space 40. For example, in plan view of stopper 30 as seen from the Y direction, the shape of stopper 30 may be any of a rectangular shape, a square shape, a circular shape, and a loop shape. The number of stoppers 30 may be changed as appropriate, as long as stopper 30 does not hinder the formation of atomic layer space 40. For example, the number of stoppers 30 disposed on photoelectric conversion unit surface 20s may be one. The number of stoppers 30 disposed on photoelectric conversion unit surface 20s may be two. The number of stoppers 30 disposed on photoelectric conversion unit surface 20s may be three. The number of stoppers 30 disposed on photoelectric conversion unit surface 20s may be four.

Here, FIGS. 4 to 7 show variations of stopper 30 of near-field thermal radiation power generation element 1 shown in FIGS. 1 to 3. Each of FIGS. 4 to 7 is a view of the cross section taken along line III-III in FIG. 1, in plan view of near-field thermal radiation power generation element 1 as seen from the Y direction.

Figure 4:
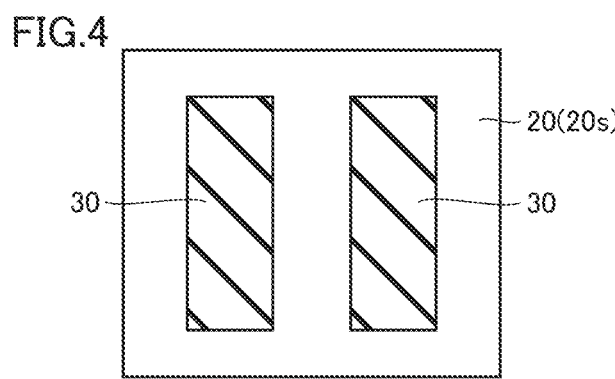
FIG. 4 is a cross sectional view showing a variation of the near-field thermal radiation power generation element according to the first embodiment.
Figure 5:
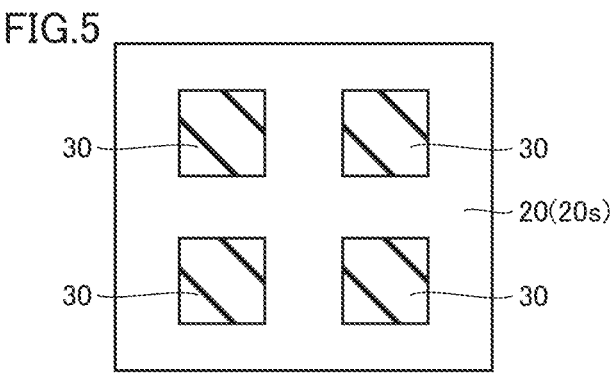
FIG. 5 is a cross sectional view showing a variation of the near-field thermal radiation power generation element according to the first embodiment.

As shown in FIG. 4, in plan view of stopper 30 as seen from the Y direction, the planar shape of stopper 30 may be a rectangular shape. Two stoppers 30 each having a rectangular planar shape may be respectively disposed on photoelectric conversion unit surface 20s. Two stoppers 30 may be disposed with a spacing therebetween. Each stopper 30 may be disposed at a position away from an outer peripheral end portion of photoelectric conversion unit surface 20s. As shown in FIG. 5, in plan view of stopper 30 as seen from the Y direction, the planar shape of stopper 30 may be a square shape. Four stoppers 30 each having a square planar shape may be respectively disposed at four positions on photoelectric conversion unit surface 20s. As shown in FIG. 5, the planar shape of photoelectric conversion unit surface 20s is a quadrangular shape. Four stoppers 30 may be respectively disposed at positions facing corners of photoelectric conversion unit surface 20s. Four stoppers 30 may be disposed to be spaced from each other. Four stoppers 30 may be disposed to be aligned in a matrix. As shown in FIG. 6, in plan view of stopper 30 as seen from the Y direction, the planar shape of stopper 30 may be a circular shape. As shown in FIG. 6, four stoppers 30 may be respectively disposed at four positions on photoelectric conversion unit surface 20s. As shown in FIG. 7, in plan view of stopper 30 as seen from the Y direction, the planar shape of stopper 30 may be a loop shape. The outer shape of the planar shape of stopper 30 may be a quadrangular shape. However, the area of stopper 30 in a plane perpendicular to the Y direction is preferably smaller than that of photoelectric conversion unit surface 20s, for example. This is because, as the contact area between stopper 30 and heat source 10 is smaller, the amount of radiation of the electromagnetic wave detected by the photoelectric conversion unit is greater, and power generation efficiency in photoelectric conversion unit 20 is improved.

<Method of Manufacturing Near-Field Thermal Radiation Power Generation Element>

FIG. 8 shows a flowchart of a method of manufacturing near-field thermal radiation power generation element 1 according to the first embodiment. Hereinafter, the method of manufacturing near-field thermal radiation power generation element 1 will be described. It should be noted that a manufacturing method in the case of using hexagonal boron nitride, which is an atomic layer material, as an example of the material for stopper 30 will be described.

As shown in FIG. 8, a step of performing preparation (S1) is performed. In this step (S1), heat source 10, photoelectric conversion unit 20, and stopper 30 are prepared. Existing elements can be used as heat source 10 and photoelectric conversion unit 20.

Then, a step of synthesizing a two-dimensional material (S2) is performed. In this step (S2), a two-dimensional material made of hexagonal boron nitride is synthesized by a thermal CVD method. A plurality of methods of synthesizing hexagonal boron nitride by the thermal CVD method have been proposed, and any method can be used. For example, hexagonal boron nitride is grown on a metal catalyst. Alternatively, hexagonal boron nitride synthesized by another method such as high-pressure pressing may be used.

Then, a step of performing transfer (S3) is performed. In this step (S3), the synthesized hexagonal boron nitride is transferred to photoelectric conversion unit 20. As a transfer method, a method similar to a method of transferring an atomic layer material such as graphene can be used. The synthesized hexagonal boron nitride may be transferred to heat source 10 instead of photoelectric conversion unit 20.

Then, a step of performing patterning (S4) is performed. In this step (S4), the transferred hexagonal boron nitride is patterned into the shape shown in FIG. 2 by photolithography or the like. However, as long as the transferred hexagonal boron nitride functions as stopper 30 according to the first embodiment and atomic layer space 40 is formed, the transferred hexagonal boron nitride (stopper 30) may not be processed. Thereafter, as an assembly step, photoelectric conversion unit 20 and heat source 10 are connected via stopper 30. As a method of connecting stopper 30 and heat source 10, any connection method of fixing relative positions of heat source 10, stopper 30, and photoelectric conversion unit 20 can be used. In this manner, near-field thermal radiation power generation element 1 as shown in FIGS. 1 to 3 can be obtained.

<Function and Effect>

Near-field thermal radiation power generation element 1 according to the present disclosure includes heat source 10, photoelectric conversion unit 20, and stopper 30. Heat source 10 has heat source surface 10a. Photoelectric conversion unit 20 has photoelectric conversion unit surface 20s. Photoelectric conversion unit surface 20s faces heat source surface 10a. Stopper 30 connects heat source surface 10a and photoelectric conversion unit surface 20s. The material for stopper 30 is a two-dimensional material.

With such a configuration, the thickness of the two-dimensional material corresponds to the thickness of the atomic layer, and thus the distance between heat source 10 and photoelectric conversion unit 20 is minimized. As a result, first distance t1, which is the distance between heat source 10 and photoelectric conversion unit 20, becomes a distance that is a target of the near-field thermal radiation. In particular, as first distance t1 is smaller, the effect due to the near-field thermal radiation increases, and the energy obtained by near-field thermal radiation power generation element 1 increases exponentially. That is, it is possible to obtain, from heat source 10, not only the blackbody limit, but also energy greater than the energy obtained by utilizing the conventional near-field thermal radiation in which the distance between heat source 10 and photoelectric conversion unit 20 is larger than the thickness of a two-dimensional material.

In near-field thermal radiation power generation element 1 described above, the material for stopper 30 is an insulating material. With such a configuration, it is possible to block exchange of an electrical signal between photoelectric conversion unit 20 and heat source 10.

Second Embodiment

<Configuration of Near-Field Thermal Radiation Power Generation Element>

Figure 9:
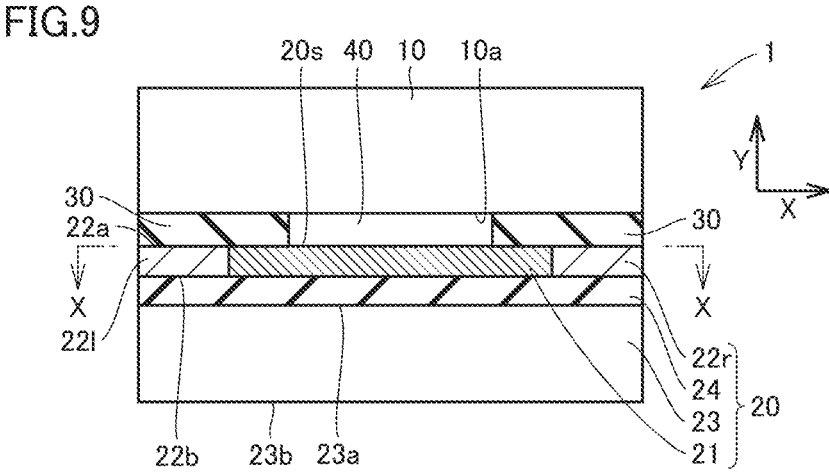
FIG. 9 is a cross sectional view of a near-field thermal radiation power generation element according to a second embodiment.
Figure 10:
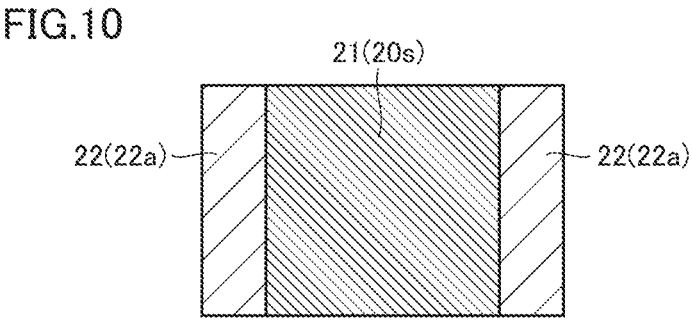
FIG. 10 is a cross sectional view taken along a line X-X in FIG. 9.

FIG. 9 is a cross sectional view of near-field thermal radiation power generation element 1 according to the second embodiment. FIG. 9 corresponds to FIG. 1. FIG. 10 is a view of a cross section taken along a line X-X in FIG. 9, in plan view of near-field thermal radiation power generation element 1 as seen from the Y direction. Near-field thermal radiation power generation element 1 shown in FIGS. 9 and 10 basically has the same configuration as that of near-field thermal radiation power generation element 1 shown in FIGS. 1 to 3, but is different in that the structure of photoelectric conversion unit 20 is a transistor structure. Specifically, as shown in FIG. 9, photoelectric conversion unit 20 is an electromagnetic wave detector including photoelectric conversion member 21 which is a two-dimensional material.

Photoelectric conversion unit 20 mainly includes photoelectric conversion member 21, a pair of electrodes 22, a substrate 23, and an insulating layer 24. Photoelectric conversion member 21 has photoelectric conversion unit surface 20s (a front surface). Photoelectric conversion unit surface

20s is a surface facing heat source surface 10a. As shown in FIGS. 9 and 10, the pair of electrodes 22 are respectively connected to side surfaces of photoelectric conversion member 21 to sandwich photoelectric conversion member 21 therebetween. Each side surface of photoelectric conversion member 21 is a surface connecting photoelectric conversion unit surface 20s of photoelectric conversion member 21 and a back surface of photoelectric conversion member 21. The back surface of photoelectric conversion member 21 is a surface opposite to photoelectric conversion unit surface 20s. Each of the pair of electrodes 22 has a first electrode surface 22a and a second electrode surface 22b. First electrode surface 22a faces heat source surface 10a. Second electrode surface 22b is a surface opposite to first electrode surface 22a. That is, a side surface of electrode 22 connecting first electrode surface 22a and second electrode surface 22b is connected to the side surface of photoelectric conversion member 21. As shown in FIG. 9, first electrode surface 22a and photoelectric conversion unit surface 20s are on the same plane.

Substrate 23 has a first substrate surface 23a and a second substrate surface 23b. Second substrate surface 23b is a surface opposite to first substrate surface 23a. First substrate surface 23a and second substrate surface 23b are formed to extend in the same direction, and are parallel to each other, for example. Substrate 23 is connected to the back surface of photoelectric conversion member 21 and second electrode surface 22b via insulating layer 24 on first substrate surface 23a. Insulating layer 24 is formed on first substrate surface 23a. When a material for electrodes 22 is a metal, an adhesion strength between electrodes 22 and insulating layer 24 is weak, and thus, for example, an adhesive film (not shown) may be formed between electrodes 22 and insulating layer 24. That is, the pair of electrodes 22 may be disposed on the adhesive film. In this case, the adhesion strength between electrodes 22 and insulating layer 24 is improved. Further, the adhesive film may not be formed between photoelectric conversion member 21 and insulating layer 24. That is, the adhesive film may be formed only between the pair of electrodes 22 and insulating layer 24. Also in this case, the pair of electrodes 22 are connected to the side surfaces of photoelectric conversion member 21. Alternatively, a configuration in which no adhesive film is formed (a configuration in which photoelectric conversion member 21 and the pair of electrodes 22 are directly formed on insulating layer 24) may be adopted. It should be noted that end portions of photoelectric conversion member 21 may be formed to extend to upper surfaces of the pair of electrodes 22. That is, the end portions of photoelectric conversion member 21 may be connected to the upper surfaces of the pair of electrodes 22. Further, the adhesive film may be formed between photoelectric conversion member 21 and insulating layer 24.

Further, regarding the disposition of photoelectric conversion member 21 and electrodes 22, photoelectric conversion member 21 may be formed on insulating layer 24, and the pair of electrodes 22 may be formed with a spacing therebetween on photoelectric conversion member 21. In this case, an adhesive film may be formed between photoelectric conversion member 21 and electrodes 22. It should be noted that the adhesive film may not be formed, and the pair of electrodes 22 may be formed to be directly connected to photoelectric conversion member 21.

Substrate 23 has a role of holding entire photoelectric conversion unit 20 which is an electromagnetic wave detector. A material for substrate 23 may be an elemental semiconductor such as silicon (Si) or germanium (Ge), for example. The material for substrate 23 may be a compound semiconductor such as a group III-V semiconductor or a group II-V semiconductor, for example. Examples of the compound semiconductor include mercury cadmium telluride (HgCdTe), indium antimonide (InSb), lead selenide (PbSe), lead sulfide (PbS), cadmium sulfide (CdS), gallium nitride (GaN), silicon carbide (SiC), gallium phosphide (GaP), indium gallium arsenide (InGaAs), indium arsenide (InAs), and gallium antimonide (GaSb). Substrate 23 may include the structure of a quantum well in which directions of movement of electrons are constrained. Alternatively, substrate 23 may include a quantum dot in which directions of movement of electrons are confined in all three-dimensional directions. Substrate 23 may be substrate 23 having a band structure called a Type-II superlattice. The Type-II superlattice may have a film configuration called a barrier type. The material for substrate 23 may be a combination of the materials described above, or an amorphous semiconductor.

When the material for substrate 23 is a substrate made of silicon, substrate 23 may be a high-resistance silicon substrate, or a substrate having a thermal oxide film formed thereon. The thermal oxide film can also serve as insulating layer 24. In order to form an electrode on second substrate surface 23*b*, a silicon substrate doped with an impurity may be used.

The material for substrate 23 may be a flexible material. When substrate 23 is a stretchable material such as polydimethylsiloxane (PDMS), for example, photoelectric conversion unit 20 can be bent. For example, when heat source 10 is a cylindrical pipe, photoelectric conversion unit 20 can be wound around the pipe and used. As a result, atomic layer space 40 following the shape of the pipe can be formed. Thus, when the material for substrate 23 is a flexible material, the shape of photoelectric conversion unit 20 can be changed as appropriate according to the shape of heat source 10, and thereby good atomic layer space 40 can be formed.

It is desirable that first substrate surface 23*a* is planarized by mirror finish or the like. This is because the formation of atomic layer space 40 is hindered if there are irregularities on first substrate surface 23*a*. In order to form good atomic layer space 40, insulating layer 24 may be formed by stacking a plurality of hexagonal boron nitride layers on first substrate surface 23*a*.

A material for insulating layer 24 disposed on first substrate surface 23*a* is silicon oxide ($SiO_2$), for example. The material for insulating layer 24 is not limited to silicon oxide, and may be tetraethyl orthosilicate ($Si(OC_2H_5)_4$), silicon nitride (SiN), silicon nitride ($Si_3N_4$), hafnium oxide ($HfO_2$), aluminum oxide ($Al_2O_3$), nickel oxide (NiO), boron nitride (BN), or a siloxane-based polymer material, for example. In particular, boron nitride (BN) has an atomic arrangement similar to that of graphene. Accordingly, even when the material for photoelectric conversion member 21 is graphene and boron nitride (BN) comes into contact with the graphene, the boron nitride does not hinder movement of charges in photoelectric conversion member 21 made of the graphene. That is, the boron nitride does not degrade the performance of photoelectric conversion member 21 made of the graphene, such as electron mobility, and thus the boron nitride is suitable as a base film disposed on the back surface of photoelectric conversion member 21.

The pair of electrodes 22 is provided on insulating layer 24 via the adhesive film. The material for electrodes 22 may be a metal such as gold (Au), silver (Ag), copper (Cu), aluminum (Al), nickel (Ni), chromium (Cr), or palladium (Pd), for example. As a material constituting the adhesive film, chromium (Cr) or titanium (Ti) can be used, for example. It should be noted that the adhesive film may not be formed between electrodes 22 and the insulating layer 24 as described above. Further, the adhesive film may be or may not be formed between insulating layer 24 and electrodes 22 in each embodiment described below. The shape of electrodes 22 is not particularly limited as long as they have a size or a thickness capable of outputting an electrical signal.

The material for electrodes 22 may be a two-dimensional material. When a two-dimensional material constituting photoelectric conversion member 21 is molybdenum disulfide ($MoS_2$), graphene can be used as a two-dimensional material constituting electrodes 22. With such a configuration, not only photoelectric conversion member 21 but also electrodes 22 are two-dimensional materials, and thus electrodes 22 do not inhibit the formation of atomic layer space 40. Accordingly, the power generation efficiency of near-field thermal radiation power generation element 1 is improved.

The pair of electrodes 22 operate as a drain electrode and a source electrode, respectively. A bias voltage is applied between the pair of electrodes 22. Alternatively, a back gate voltage is applied to second substrate surface 23*b*. This configuration is that of an ordinary field effect transistor. Photoelectric conversion member 21 disposed between the drain electrode and the source electrode is irradiated with an electromagnetic wave radiated from heat source 10. As a result, energy of the radiated electromagnetic wave is photoelectrically converted in photoelectric conversion member 21, whereby a current change occurs, and the current change is extracted as an electrical signal. In this manner, the energy of the electromagnetic wave radiated from heat source 10 is converted into electricity.

Photoelectric conversion member 21 is disposed on insulating layer 24. Photoelectric conversion member 21 is connected to the pair of electrodes 22. It is only necessary that photoelectric conversion member 21 is satisfactorily electrically connected to electrodes 22, and photoelectric conversion member 21 may be connected to first electrode surface 22*a* or second electrode surface 22*b* of each electrode 22. As shown in FIG. 9, electrode 22 may be connected to only the side surface of photoelectric conversion member 21. Such a structure in which electrode 22 is connected to only the side surface of photoelectric conversion member 21 is called an edge contact. With such a configuration, a contact resistance between photoelectric conversion member 21 and electrode 22 is reduced, and thus the power generation efficiency of near-field thermal radiation power generation element 1 is improved.

The material for photoelectric conversion member 21 may be a two-dimensional material, for example. The two-dimensional material constituting photoelectric conversion member 21 is single-layer graphene, for example. Since graphene has a Dirac cone bandgap, when the two-dimensional material constituting photoelectric conversion member 21 is graphene, photoelectric conversion unit 20 can detect electromagnetic waves including wide-band wavelength components from an ultraviolet ray to terahertz wave. That is, photoelectric conversion unit 20 using a two-dimensional material has a power generation efficiency higher than that of an ordinary electromagnetic wave detector using a semiconductor having a PN junction.

Here, the graphene is a monoatomic layer of a two-dimensional carbon crystal. The single-layer graphene has a thickness of 0.34 nm, which corresponds to that of one carbon atom. That is, the single-layer graphene is very thin.

Further, the arrangement structure of carbon atoms in the graphene is a hexagonal honeycomb structure formed by bonding of the carbon atoms.

The two-dimensional material may not be single-layer graphene. For example, the two-dimensional material may be multilayer graphene. When the two-dimensional material is multilayer graphene, the stacking pattern of carbon atom layers may be AB stacking or turbostratic stacking. The AB stacking is a stacking pattern seen in graphite with a natural stacking azimuth angle. The turbostratic stacking (tur- bostratic graphene) is also called random stacking. When the stacking pattern of the two-dimensional material is the turbostratic stacking, a method of preparing the two-dimensional material may be determined as appropriate. For example, single-layer graphene formed by a CVD method may be transferred a plurality of times, to form a turbostratic structure portion. Further, ethanol, methane, or the like may be supplied as a carbon source onto graphene serving as a base, and graphene may be grown by the CVD method on the graphene serving as the base, to form the stacking pattern of the turbostratic stacking.

When photoelectric conversion member 21 has a stacking structure of multilayer graphene including two or more layers, in any two layers of the graphene included in the stacking structure, directions of lattice vectors of hexagonal lattices may not match with each other. In other words, in any two layers of the graphene, orientations of the lattice vectors of the respective hexagonal lattices may be deviated. Further, in any two layers of the graphene, the directions of the lattice vectors of the hexagonal lattices may match with each other. In particular, when photoelectric conversion member 21 has the stacking structure of the multilayer graphene including two or more layers, a bandgap is formed in photoelectric conversion member 21, and a wavelength that can be absorbed from heat source 10 can be selected. That is, when the number of stacked layers of graphene is increased, the light absorption rate of photoelectric conver- sion member 21 increases. Accordingly, sensitivity of pho- toelectric conversion unit 20 as an electromagnetic wave detector is improved.

The graphene may be a graphene nanoribbon in the shape of a band cut to have a nanometer-sized width. The structure of the graphene may be any of a structure of a graphene nanoribbon alone, a structure having a plurality of stacked graphene nanoribbons, and a structure in which graphene nanoribbons are periodically disposed on a plane. The structure in which graphene nanoribbons are periodically disposed is called a graphene metamaterial. When photo- electric conversion member 21 has the structure in which graphene nanoribbons are periodically disposed, plasmon resonance occurs in photoelectric conversion member 21. As a result, sensitivity as a photodetector is improved in pho- toelectric conversion member 21.

A surface plasmon resonance phenomenon caused by an interaction between a metal surface and light, a phenomenon called pseudo surface plasmon resonance caused on a metal surface in a range other than a visible light range or a near-infrared light range, and a resonance phenomenon caused on a metamaterial (plasmonic metamaterial) or a metasurface which artificially manipulates a wavelength by utilizing a structure finer than the wavelength of an electro- magnetic wave, are referred to herein as surface plasmon resonance, plasmon resonance, or simply, resonance, with- out distinguishing the names.

Other than the graphene, the two-dimensional material may be transition metal dichalcogenide (TMD), black phos- phorus, silicene (an atomic sheet having a two-dimensional honeycomb structure made of silicon atoms), or germanene (an atomic sheet having a two-dimensional honeycomb structure made of germanium atoms), for example. Examples of the transition metal dichalcogenide include molybdenum disulfide ($MoS_2$), tungsten disulfide ($WS_2$), and tungsten diselenide ($WSe_2$). Thus, the two-dimensional material may include any one selected from the group consisting of graphene, transition metal dichalcogenide, black phosphorus, silicene, germanene, a graphene nanorib- bon, and borofene. Alternatively, a two-dimensional mate- rial obtained by stacking each of these materials may be used.

<Method of Manufacturing Near-Field Thermal Radiation Power Generation Element>

Figure 11:
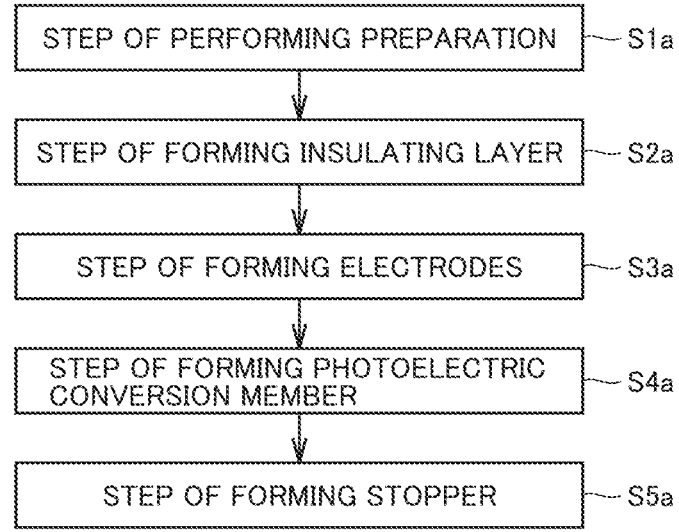
FIG. 11 is a flowchart of a method of manufacturing the near-field thermal radiation power generation element according to the second embodiment.

FIG. 11 shows a flowchart of a method of manufacturing near-field thermal radiation power generation element 1 according to the second embodiment. Hereinafter, the method of manufacturing near-field thermal radiation power generation element 1 according to the second embodiment will be described.

As shown in FIG. 11, a step of performing preparation (S1a) is performed. In this step (S1a), flat substrate 23 made of silicon or the like is prepared.

Then, a step of forming the insulating layer (S2a) is performed. In this step (S2a), insulating layer 24 is formed on first substrate surface 23a of substrate 23. For example, when substrate 23 is silicon, insulating layer 24 may be silicon oxide ($SiO_2$) formed by thermal oxidation. Further, insulating layer 24 may be formed by the CVD method or a sputtering method.

Then, a step of forming the electrodes (S3a) is performed. In this step (S3a), electrodes 22 made of a metal are formed. The metal is a metal such as gold (Au), silver (Ag), copper (Cu), aluminum (Al), nickel (Ni), chromium (Cr), or palla- dium (Pd). In order to improve adhesiveness between elec- trodes 22 and insulating layer 24, an adhesive film may be formed between electrodes 22 and insulating layer 24. The material for the adhesive film is chromium (Cr) or titanium (Ti), for example. Electrodes 22 are formed by forming a resist mask using photoengraving, EB lithography, or the like, and then depositing a metal layer on the resist mask by vapor deposition, the sputtering method, or the like.

Then, a step of forming photoelectric conversion member 21 (S4a) is performed. In this step (S4a), photoelectric conversion member 21 made of a two-dimensional material is formed on electrodes 22 and insulating layer 24. When the two-dimensional material is graphene, the graphene may be formed by epitaxial growth, or graphene formed in advance by the CVD method may be transferred and attached. Alternatively, graphene exfoliated by a mechanical method may be transferred. Thereafter, the graphene coated with a resist mask by photoengraving or the like is etched with oxygen plasma, and is patterned. Thereby, unnecessary graphene is removed at a portion other than a region where the graphene is in contact with a channel portion or elec- trodes 22. In this manner, photoelectric conversion member 21 serving as the channel portion is formed. Through the above steps, photoelectric conversion unit 20 according to the second embodiment is obtained. It should be noted that, after photoelectric conversion member 21 is formed, elec- trodes 22 may be formed thereon.

Then, a step of forming stopper 30 (S5a) is performed. In this step (S5a), the steps from the step of synthesizing a two-dimensional material (S2) to the step of performing patterning (S4) in the manufacturing method in the first embodiment are performed. The material for stopper 30 is preferably boron nitride, but may be hexagonal boron nitride. When the material for photoelectric conversion member 21 is graphene, the graphene and the hexagonal boron nitride are lattice-matched, and thus the hexagonal boron nitride does not hinder electronic performance of the graphene. For example, when the hexagonal boron nitride is used as a base film of the graphene, carrier mobility of the graphene is improved by about three times as compared with that of an ordinary oxide film. This is because the sensitivity of photoelectric conversion unit 20 is substantially proportional to the carrier mobility of the graphene. Accordingly, when the material for photoelectric conversion member 21 is graphene and the material for stopper 30 is hexagonal boron nitride, photoelectric conversion unit 20 as an electron detector has the highest power generation efficiency. Thereafter, as an assembly step, photoelectric conversion unit 20 and heat source 10 are connected via stopper 30, as in the method of manufacturing the near-field thermal radiation power generation element according to the first embodiment. In this manner, near-field thermal radiation power generation element 1 as shown in FIG. 9 or 10 can be obtained.

<Function and Effect>

In near-field thermal radiation power generation element 1 described above, photoelectric conversion unit 20 includes photoelectric conversion member 21. Photoelectric conversion member 21 has photoelectric conversion unit surface 20s. The material for photoelectric conversion member 21 is a two-dimensional material. With such a configuration, the power generation efficiency of the near-field thermal radiation power generation element can be improved by selecting the type and configuration of the two-dimensional material constituting photoelectric conversion member 21 as appropriate. For example, when the two-dimensional material constituting photoelectric conversion member 21 is graphene, photoelectric conversion unit 20 can detect electromagnetic waves including wide-band wavelength components from an ultraviolet ray to terahertz wave. As a result, the power generation efficiency of near-field thermal radiation power generation element 1 is improved.

In near-field thermal radiation power generation element 1 described above, photoelectric conversion unit 20 includes substrate 23, insulating layer 24, and the pair of electrodes 22. The pair of electrodes 22 are connected with photoelectric conversion member 21. Insulating layer 24 is formed between substrate 23 and electrodes 22. With such a configuration, the structure of photoelectric conversion unit 20 is a transistor structure using a two-dimensional material, and transistor-type photoelectric conversion unit 20 can perform energy conversion by near-field thermal radiation.

In near-field thermal radiation power generation element 1 described above, the material for electrodes 22 is a two-dimensional material. With such a configuration, not only photoelectric conversion member 21 but also electrodes 22 are two-dimensional materials, and thus electrodes 22 do not hinder the formation of atomic layer space 40. Accordingly, the power generation efficiency of near-field thermal radiation power generation element 1 is improved. For example, when the two-dimensional material constituting photoelectric conversion member 21 is molybdenum disulfide ($MoS_2$), graphene can be used as the two-dimensional material constituting electrodes 22. With such a configuration, the power generation efficiency of near-field thermal radiation power generation element 1 can be improved.

In near-field thermal radiation power generation element 1 described above, substrate 23 has flexibility. With such a configuration, the shape of photoelectric conversion unit 20 can be changed as appropriate according to the shape of heat source 10. As a result, good atomic layer space 40 can be formed even when heat source surface 10a is not flat. Accordingly, the power generation efficiency of near-field thermal radiation power generation element 1 can be improved.

In near-field thermal radiation power generation element 1 described above, the material for photoelectric conversion member 21 is any one selected from the group consisting of a single-layer two-dimensional material, a multilayer two-dimensional material, and a turbostratic stacked two-dimensional material. With such a configuration, for example, when the number of stacked layers of the two-dimensional material is increased, the light absorption rate of photoelectric conversion member 21 increases. Accordingly, the sensitivity of photoelectric conversion unit 20 as an electromagnetic wave detector is improved. Further, when the material for photoelectric conversion member 21 is a turbostratic stacked two-dimensional material, mobility in photoelectric conversion member 21 increases, and the sensitivity of photoelectric conversion unit 20 is further improved due to a high independence of the stacked layers in the two-dimensional material.

In near-field thermal radiation power generation element 1 described above, the material for photoelectric conversion member 21 is graphene. The material for stopper 30 is hexagonal boron nitride. With such a configuration, photoelectric conversion member 21 and stopper 30 are lattice-matched. The hexagonal boron nitride has not only an insulating property but also an atomic arrangement similar to that of the graphene. Accordingly, when the hexagonal boron nitride comes into contact with the graphene, the hexagonal boron nitride suppresses a decrease in electron mobility of the graphene, and thus the power generation efficiency of near-field thermal radiation power generation element 1 is improved.

Third Embodiment

<Configuration of Near-Field Thermal Radiation Power Generation Element>

Figure 12:
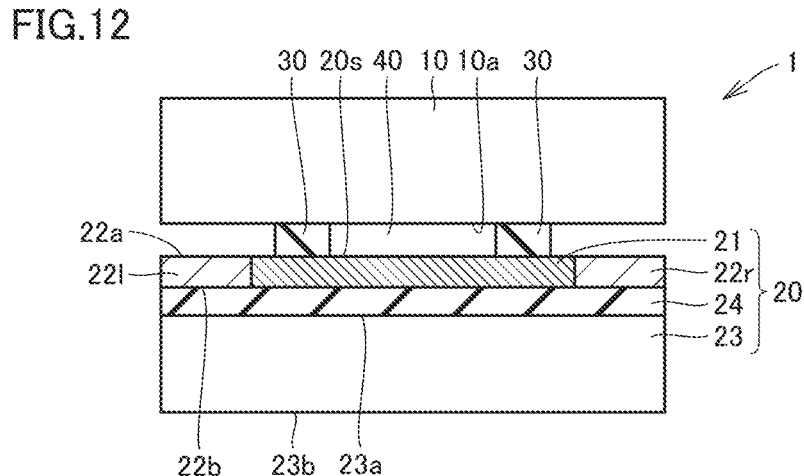
FIG. 12 is a cross sectional view of a near-field thermal radiation power generation element according to a third embodiment.

FIG. 12 is a cross sectional view of near-field thermal radiation power generation element 1 according to a third embodiment. FIG. 12 corresponds to FIG. 9. Near-field thermal radiation power generation element 1 shown in FIG. 12 basically has the same configuration as that of near-field thermal radiation power generation element 1 shown in FIGS. 9 and 10, but is different in that stopper 30 is in contact with only photoelectric conversion unit surface 20s of photoelectric conversion member 21, at a connection portion between stopper 30 and photoelectric conversion unit 20.

Stopper 30 in near-field thermal radiation power generation element 1 according to the second embodiment is in contact with not only photoelectric conversion unit surface 20s but also first electrode surface 22a of each of the pair of electrodes 22. On the other hand, stopper 30 of near-field thermal radiation power generation element 1 according to the third embodiment is not in contact with first electrode surface 22a of electrode 22, and is in contact with only photoelectric conversion unit surface 20s.

With such a configuration, influence of electrodes 22 or other wires is eliminated in the formation of atomic layer space 40. Accordingly, it is desirable for the formation of atomic layer space 40 to dispose stopper 30 on photoelectric conversion unit surface 20s. On this occasion, when the material for stopper 30 is hexagonal boron nitride and the material for photoelectric conversion member 21 is graphene, the power generation efficiency of near-field thermal radiation power generation element 1 can be effectively improved.

<Function and Effect>

In near-field thermal radiation power generation element 1 described above, stopper 30 is connected to only photoelectric conversion unit surface 20s. With such a configuration, influence of electrodes 22 or other wires is eliminated in the formation of atomic layer space 40. As a result, good atomic layer space 40 can be formed, and the power generation efficiency of near-field thermal radiation power generation element 1 can be improved.

Fourth Embodiment

<Configuration of Near-Field Thermal Radiation Power Generation Element>

Figure 13:
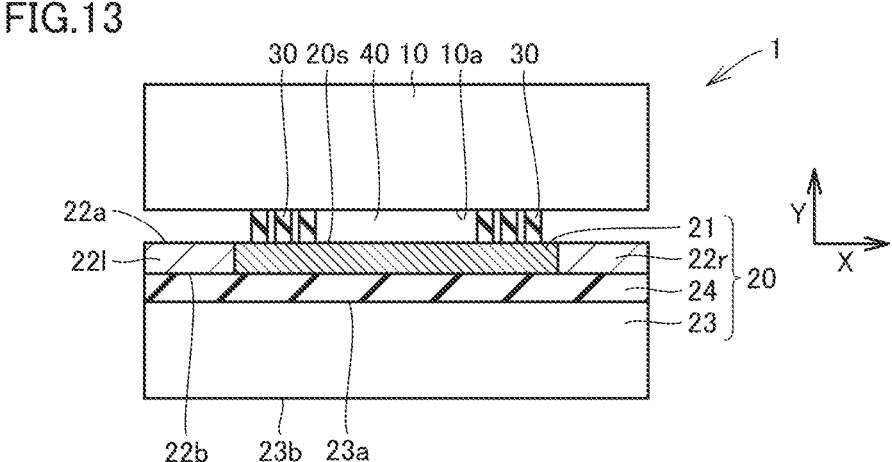
FIG. 13 is a cross sectional view of a near-field thermal radiation power generation element according to a fourth embodiment.

FIG. 13 is a cross sectional view of near-field thermal radiation power generation element 1 according to a fourth embodiment. FIG. 13 corresponds to FIG. 12. Near-field thermal radiation power generation element 1 shown in FIG. 13 basically has the same configuration as that of near-field thermal radiation power generation element 1 shown in FIG. 12, but is different in that stopper 30 has a porous shape or a stripe shape in a cross sectional view of near-field thermal radiation power generation element 1 as seen from a direction perpendicular to each of the X direction and the Y direction. Specifically, as shown in FIG. 13, in stopper 30, a through hole is formed to reach a surface connected to photoelectric conversion unit surface 20s from a surface connected to heat source surface 10a.

When stopper 30 is constituted by a single layer, stopper 30 may have a vacancy. In near-field thermal radiation power generation element 1, heat source 10 and photoelectric conversion unit 20 are connected via stopper 30. When near-field thermal radiation power generation element 1 is used, a pressure in the Y direction is applied to heat source 10 and photoelectric conversion unit 20. Accordingly, when stopper 30 has a porous shape or a stripe shape, an impact due to the pressure is alleviated. As a result, durability of near-field thermal radiation power generation element 1 can be improved, and the life of such a product can be prolonged.

<Function and Effect>

In near-field thermal radiation power generation element 1 described above, either a through hole or a vacancy is formed in stopper 30. With such a configuration, durability of photoelectric conversion unit 20 is improved. That is, when near-field thermal radiation power generation element 1 is used, a pressure in the Y direction is applied to heat source 10 and photoelectric conversion unit 20. Accordingly, when stopper 30 has a shape in which either a through hole or a vacancy is formed, an impact due to the pressure is alleviated. As a result, the durability of near-field thermal radiation power generation element 1 is improved, and the life of near-field thermal radiation power generation element 1 can be prolonged.

Fifth Embodiment

<Configuration of Near-Field Thermal Radiation Power Generation Element>

Figure 14:
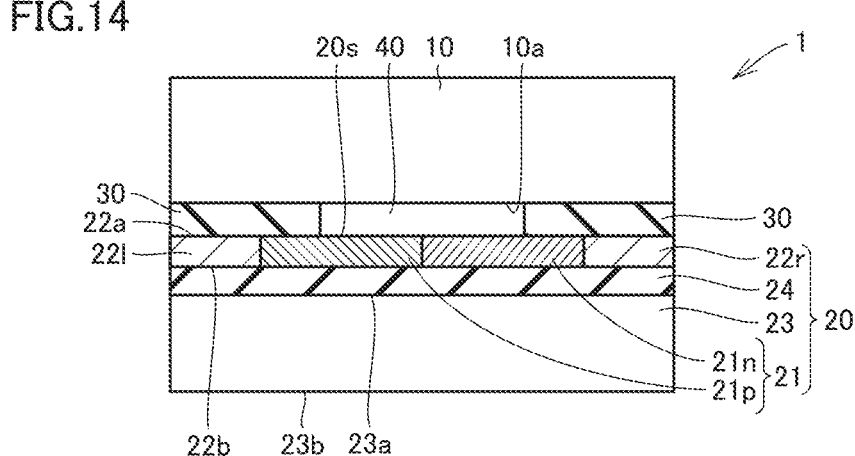
FIG. 14 is a cross sectional view of a near-field thermal radiation power generation element according to a fifth embodiment.

FIG. 14 is a cross sectional view of near-field thermal radiation power generation element 1 according to a fifth embodiment. FIG. 14 corresponds to FIG. 9. Near-field thermal radiation power generation element 1 shown in FIG. 14 basically has the same configuration as that of near-field thermal radiation power generation element 1 shown in FIGS. 9 and 10, but is different in that photoelectric conversion member 21 has a PN junction. Specifically, as shown in FIG. 14, photoelectric conversion member 21 made of a two-dimensional material includes an N-type region 21n and a P-type region 21p.

As a PN junction, N-type region 21n and P-type region 21p are joined. A surface where N-type region 21n and P-type region 21p are joined is formed to extend in the Y direction. The surface where N-type region 21n and P-type region 21p are joined is disposed to be sandwiched between the pair of electrodes 22. That is, one of the pair of electrodes 22 is connected to N-type region 21n, and the other of the pair of electrodes 22 is connected to P-type region 21p. With such a configuration, when photoelectric conversion member 21 made of a two-dimensional material serves as a channel, a bias voltage is applied to photoelectric conversion member 21. That is, it is not necessary to apply a bias voltage from an external power source to photoelectric conversion member 21. As a result, the power generation efficiency (energy conversion efficiency) of near-field thermal radiation power generation element 1 is improved.

Various methods may be adopted as a method of forming a PN junction in photoelectric conversion member 21. For example, N-type region 21n and P-type region 21p are formed by bringing a doping material that supplies carriers (holes or electrons) into contact with photoelectric conversion member 21 made of a two-dimensional material. Accordingly, photoelectric conversion member 21 is in a state in which a PN junction is formed in a pseudo manner. With such a configuration, in FIG. 14, when the left region of photoelectric conversion member 21 is defined as P-type region 21p and the right region thereof is defined as N-type region 21n, efficiency of extracting an electrical signal from a left electrode 221 connected to P-type region 21p and efficiency of extracting an electrical signal from a right electrode 22r connected to N-type region 21n are improved. In this manner, the sensitivity of photoelectric conversion unit 20 as an electromagnetic wave detector is improved.

The doping material may be any material that causes imbalance of charges and causes polarization. For example, the doping material may be an organic material, a metal, a semiconductor, an insulator, a two-dimensional material, or a mixture of any of these materials.

The doping material may be a positive photoresist, for example. The positive photoresist is a composition containing a photosensitizing agent having a quinonediazide group and a novolak resin, for example. When the doping material is a positive photoresist, a region where the positive photoresist is formed serves as P-type region 21p of photoelectric conversion member 21.

The positive photoresist is formed on photoelectric conversion member 21 by a photolithography process, for example. Thereby, a process of forming a mask in contact with photoelectric conversion member 21 is not required. In the process of forming the mask, photoelectric conversion member 21 may be damaged. Since the process of forming the mask is not required, the risk of damage to photoelectric conversion member 21 can be reduced, and the process of manufacturing photoelectric conversion member 21 can be simplified.

The doping material may be a material having a polar group, for example. The doping material may be a material having an electron-attracting group, for example. When the doping material is a material having an electron-attracting group, the electron density of photoelectric conversion member 21 decreases. The material having an electron-attracting group is a material having a halogen, a nitrile group, a carboxyl group, a carbonyl group, or the like, for example.

Further, the doping material may be a material having an electron-donating group, for example. When the doping material is a material having an electron-donating group, the electron density of photoelectric conversion member 21 increases. The material having an electron-donating group is a material having an alkyl group, a hydroxy group, an amino group, or the like, for example.

The doping material may be a material that supplies molecules or the like to photoelectric conversion member 21, for example. The doping material may be a liquid layer or a gas layer containing molecules, for example. Photoelectric conversion member 21 may be immersed in the liquid layer, or may be exposed to the gas layer. With such a configuration, carriers are supplied at a molecular level from the liquid layer or the gas layer to photoelectric conversion member 21.

When photoelectric conversion member 21 made of a two-dimensional material comes into contact with a metal, carriers (holes or electrons) are doped from the metal into photoelectric conversion member 21 due to a difference between a work function of the metal and a work function of photoelectric conversion member 21 made of graphene or the like. As a result, a Fermi level of photoelectric conversion member 21 or a contact resistance between photoelectric conversion member 21 and the metal changes.

In FIG. 14, when right electrode 22r is made of a metal material different from that for left electrode 22l, an energy gap in a region in contact with right electrode 22r in photoelectric conversion member 21 is different from an energy gap in a region in contact with left electrode 22l. That is, a PN junction is formed in a pseudo manner in photoelectric conversion member 21. Also in this case, the efficiency of extracting an electrical signal (a current) from left electrode 22l and the efficiency of extracting an electrical signal from right electrode 22r are each improved. As a result, the sensitivity of photoelectric conversion unit 20 as an electromagnetic wave detector is improved, and no bias voltage is required, and thereby the power generation efficiency of near-field thermal radiation power generation element 1 is improved.

<Function and Effect>

In near-field thermal radiation power generation element 1 described above, photoelectric conversion member 21 has a PN junction. With such a configuration, photoelectric conversion unit 20 does not require a bias voltage, and the power generation efficiency of near-field thermal radiation power generation element 1 is improved.

Sixth Embodiment

<Configuration of Near-Field Thermal Radiation Power Generation Element>

Figure 15:
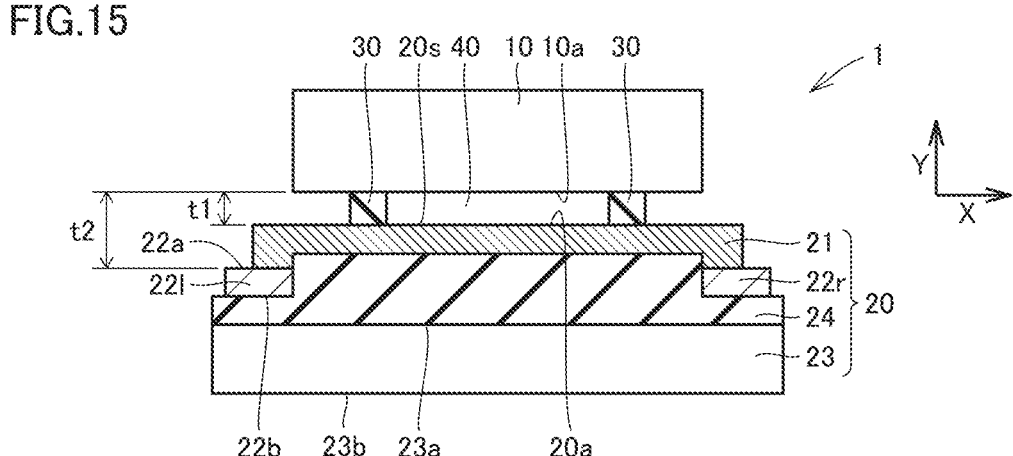
FIG. 15 is a cross sectional view of a near-field thermal radiation power generation element according to a sixth embodiment.

FIG. 15 is a cross sectional view of near-field thermal radiation power generation element 1 according to a sixth embodiment. FIG. 15 corresponds to FIG. 12. Near-field thermal radiation power generation element 1 shown in FIG. 15 basically has the same configuration as that of near-field thermal radiation power generation element 1 shown in FIG. 12, but is different in that photoelectric conversion unit surface 20s is closer to heat source surface 10a than first electrode surface 22a of each electrode 22. Specifically, as shown in FIG. 15, first distance t1 is smaller than a second distance t2. Second distance t2 is a distance from heat source surface 10a to first electrode surface 22a in the Y direction.

That is, photoelectric conversion unit surface 20s is closer to heat source surface 10a than first electrode surface 22a. With such a configuration, the formation of atomic layer space 40 is not hindered by the thickness of electrodes 22 in the Y direction.

<Function and Effect>

In near-field thermal radiation power generation element 1 described above, electrodes 22 each have first electrode surface 22a. First electrode surface 22a is a surface facing heat source surface 10a. First distance t1 is smaller than second distance t2. First distance t1 is a distance from heat source surface 10a to photoelectric conversion unit surface 20s. Second distance t2 is a distance from heat source surface 10a to first electrode surface 22a. With such a configuration, photoelectric conversion unit surface 20s is closer to heat source surface 10a than first electrode surface 22a, and thus the formation of atomic layer space 40 is not hindered by the thickness of electrodes 22 in the Y direction.

Seventh Embodiment

<Configuration of Near-Field Thermal Radiation Power Generation Element>

Figure 16:
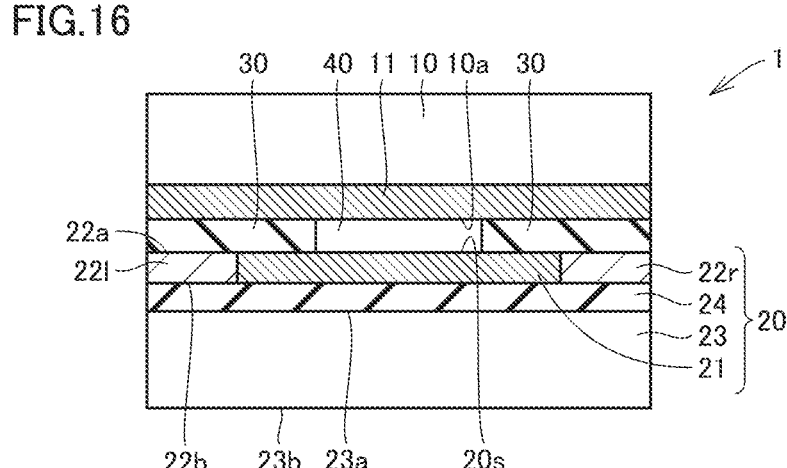
FIG. 16 is a cross sectional view of a near-field thermal radiation power generation element according to a seventh embodiment.

FIG. 16 is a cross sectional view of near-field thermal radiation power generation element 1 according to a seventh embodiment. FIG. 16 corresponds to FIG. 9. Near-field thermal radiation power generation element 1 shown in FIG. 16 basically has the same configuration as that of near-field thermal radiation power generation element 1 shown in FIGS. 9 and 10, but is different in that heat source 10 has a two-dimensional material layer 11 as a covering layer. Specifically, as shown in FIG. 16, two-dimensional material layer 11 is formed on a surface (a lower surface) of heat source 10 facing stopper 30. A surface of two-dimensional material layer 11 (a surface facing stopper 30) serves as heat source surface 10a. Stopper 30 is connected to heat source surface 10a. Heat source 10 may include a cover that covers heat source 10. Two-dimensional material layer 11 may be formed on a surface of the cover facing stopper 30.

Here, when graphene and graphene are stacked, and the stacking structure has a stacking pattern which is the AB stacking having a stable stacking azimuth angle, the distance between the graphenes is the smallest. On the other hand, when the stacking structure has a stacking pattern other than the AB stacking, the distance between the graphenes is larger than the distance between the graphenes when the stacking pattern is the AB stacking. This is because a repulsive force acts between the stacked graphenes. By utilizing this characteristic, when materials for two-dimensional material layer 11 and photoelectric conversion member 21 are graphenes, the repulsive force described above acts between two-dimensional material layer 11 and photoelectric conversion member 21, and thereby good atomic layer space 40 is formed. For example, when viewed at an atomic layer level, the lower surface of heat source 10 (the surface on which two-dimensional material layer 11 is formed) has irregularities. Heat source surface 10a, which is a surface of two-dimensional material layer 11 formed on the lower surface, may also have irregularities due to the irregularities of the lower surface. However, since two-dimensional material layer 11 is formed on the lower surface, a repulsive force acts between photoelectric conversion member 21 and two-dimensional material layer 11, and atomic layer space 40 is microscopically formed. That is, even if the lower surface of heat source 10 and heat source surface 10a have irregularities, good atomic layer space 40 is formed. In this manner, the power generation efficiency of near-field thermal radiation power generation element 1 is improved. Further, a space between two-dimensional material layer 11 and photoelectric conversion member 21 may be maintained in vacuum.

<Function and Effect>

In near-field thermal radiation power generation element 1 described above, heat source 10 includes two-dimensional material layer 11. Two-dimensional material layer 11 has heat source surface 10*a*. Two-dimensional material layer 11 is made of a two-dimensional material. With such a configuration, when the materials for photoelectric conversion member 21 and two-dimensional material layer 11 are graphenes, a repulsive force acts between photoelectric conversion member 21 and two-dimensional material layer 11, and good atomic layer space 40 is formed even if there are irregularities on heat source surface 10*a*. As a result, the power generation efficiency of near-field thermal radiation power generation element 1 is improved.

Eighth Embodiment

<Configuration of Near-Field Thermal Radiation Power Generation Element>

Figure 17:
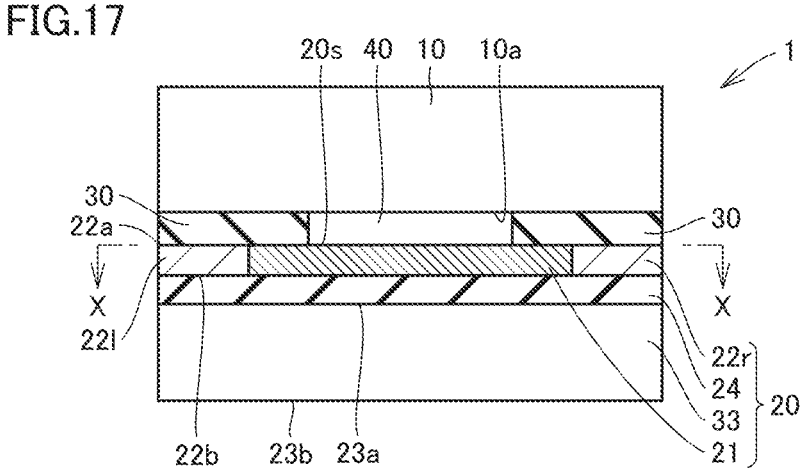
FIG. 17 is a cross sectional view of a near-field thermal radiation power generation element according to an eighth embodiment.

FIG. 17 is a cross sectional view of near-field thermal radiation power generation element 1 according to an eighth embodiment. FIG. 17 corresponds to FIG. 9. Near-field thermal radiation power generation element 1 shown in FIG. 17 basically has the same configuration as that of near-field thermal radiation power generation element 1 shown in FIGS. 9 and 10, but is different in that a material for a substrate 33 is a photosensitizer. When the material for substrate 33 is a photosensitizer, a photogating effect occurs in photoelectric conversion unit 20.

Hereinafter, the photogating effect will be described. It is assumed that the material for photoelectric conversion member 21 is graphene. The graphene has an electron mobility higher than that of an ordinary semiconductor, and a large current change is produced in response to a slight voltage change. In order to utilize this characteristics of the graphene, a photosensitizer is adopted as the material for substrate 33. The photosensitizer is a material that produces a voltage change at a particular wavelength. The photosensitizer may not be the material for substrate 33. The photosensitizer may be disposed in the vicinity of photoelectric conversion member 21 made of the graphene, for example. The photosensitizer may be formed on photoelectric conversion member 21, for example, and there is no limitation on the location of disposing the photosensitizer, as long as the photosensitizer is disposed at a position adjacent to photoelectric conversion member 21.

Of electromagnetic waves radiated from heat source 10, for visible light, silicon or a compound semiconductor functions as a photosensitizer (also referred to as a photosensitizing layer). For an infrared ray, a ferroelectric body or the like functions as a photosensitizing layer. When an electromagnetic wave is incident on the photosensitizing layer, photoelectric conversion or a pyroelectric effect occurs, and thereby a voltage change is produced in the graphene. As a result, as compared with a case where no photosensitizing layer is provided, the current change produced in the graphene increases by 10 times to 10000 times or more. By using the photosensitizer, such a large current can be extracted in photoelectric conversion unit 20. Accordingly, photoelectric conversion unit 20 can detect the electromagnetic wave radiated from heat source 10 with a high sensitivity. Such an effect is called a photogating effect.

By using such a material that produces the photogating effect (a photosensitizer), the power generation efficiency of near-field thermal radiation power generation element 1 can be improved. In particular, when substrate 33 is a ferroelectric body, a change in bias voltage can be provided to the graphene without applying a back gate voltage to the graphene, and thus the power generation efficiency of near-field thermal radiation power generation element 1 can be improved.

As the ferroelectric body, a material that causes polarization when an electromagnetic wave having a wavelength to be detected is incident on the ferroelectric body can be used. The ferroelectric body includes, for example, any one selected from the group consisting of barium titanate ($BaTiO_3$), lithium niobate ($LiNbO_3$), lithium tantalate ($LiTaO_3$), strontium titanate ($SrTiO_3$), lead zirconate titanate (PZT), strontium bismuth tantalate (SBT), bismuth ferrite (BFO), zinc oxide (ZnO), hafnium oxide ($HfO_2$), and a polyvinylidene fluoride-based ferroelectric body (PVDF, P(VDF-TrFE), P(VDF-TrFE-CTFE), or the like) as an organic polymer. Further, the ferroelectric body may be a material formed by stacking or mixing a plurality of the different materials described above.

As the ferroelectric body, a material different from the materials described above can be used, as long as it is a pyroelectric body that exhibits a pyroelectric effect. Specifically, the pyroelectric body constituting the ferroelectric body may be any material in which a polarization change is produced in response to a change in heat energy inside the pyroelectric body. It should be noted that, regarding the pyroelectric effect described above, the electromagnetic wave simply acts as a supply source of heat energy. Accordingly, the magnitude of the pyroelectric effect basically does not depend on a wavelength component included in the electromagnetic wave. That is, when the pyroelectric body is used as the ferroelectric body constituting the photosensitizing layer, the pyroelectric body has sensitivity to wideband wavelength components for the electromagnetic waves generated from heat source 10. Therefore, power can be efficiently generated by wide-band electromagnetic waves.

<Function and Effect>

In near-field thermal radiation power generation element 1 described above, photoelectric conversion unit 20 includes a photosensitizer. With such a configuration, the photogating effect occurs in photoelectric conversion unit 20, and a voltage change produced in photoelectric conversion member 21 can be extracted as a large differential current. As a result, photoelectric conversion unit 20 can detect the electromagnetic wave radiated from heat source 10 with a high sensitivity. Accordingly, the power generation efficiency of near-field thermal radiation power generation element 1 is improved.

Ninth Embodiment

<Configuration of Near-Field Thermal Radiation Power Generation Element>

Figure 18:
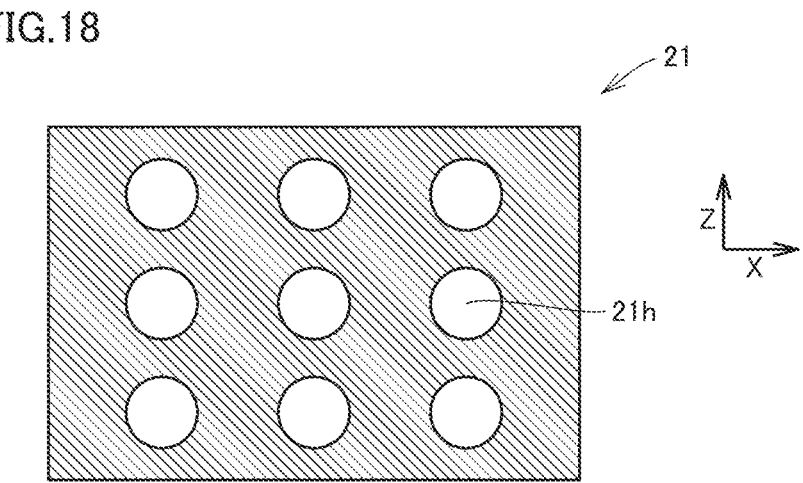
FIG. 18 is a plan view of a photoelectric conversion member of a near-field thermal radiation power generation element according to a ninth embodiment.
Figure 19:
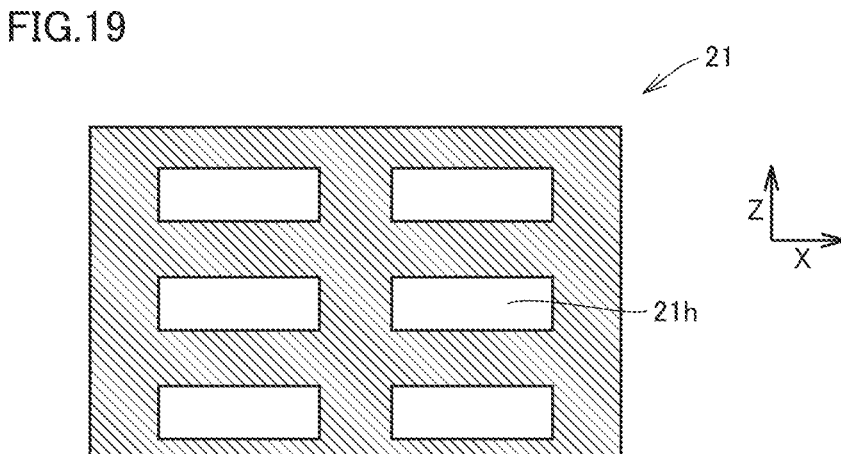
FIG. 19 is a plan view showing a variation of the photoelectric conversion member of the near-field thermal radiation power generation element according to the ninth embodiment.
Figure 20:
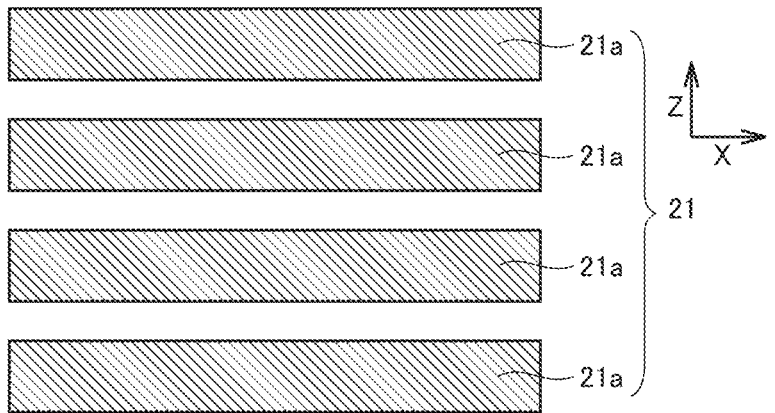
FIG. 20 is a plan view showing a variation of the photoelectric conversion member of the near-field thermal radiation power generation element according to the ninth embodiment.
Figure 21:
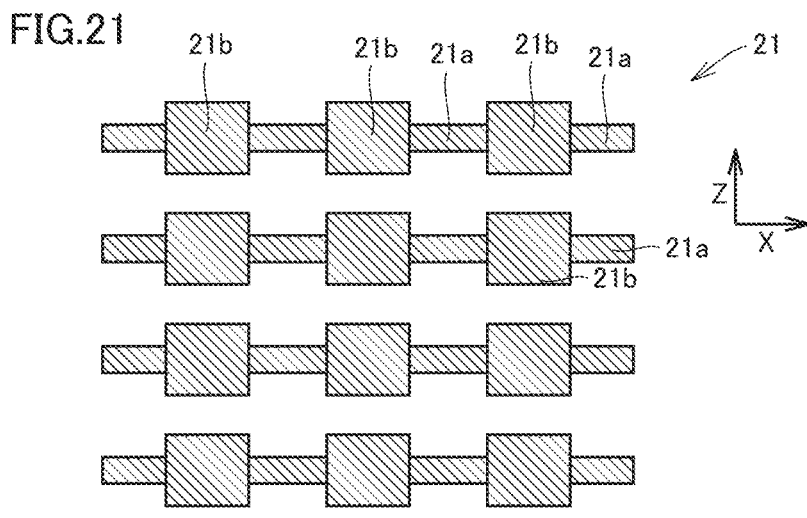
FIG. 21 is a plan view showing a variation of the photoelectric conversion member of the near-field thermal radiation power generation element according to the ninth embodiment.

FIG. 18 is a plan view showing photoelectric conversion member 21 of near-field thermal radiation power generation element 1 according to a ninth embodiment. FIGS. 19 to 21 are plan views showing variations of photoelectric conversion member 21 of near-field thermal radiation power generation element 1 shown in FIG. 18. Near-field thermal radiation power generation element 1 shown in FIGS. 18 to 21 basically has the same configuration as that of near-field thermal radiation power generation element 1 shown in FIGS. 9 and 10, but is different in that the shape of photoelectric conversion member 21 is a shape in which plasmon resonance occurs.

FIGS. 18 to 21 are plan views of photoelectric conversion member 21 as seen from the Y direction. The shape of photoelectric conversion member 21 may be any shape as long as plasmon resonance occurs. For example, as shown in FIG. 18, photoelectric conversion member 21 may have a plurality of through holes 21h. The plurality of through holes 21h may be periodically disposed in each of the X direction and the Z direction. That is, the plurality of through holes 21h may be disposed in a matrix. The Z direction is a direction perpendicular to each of the X direction and the Y direction. The planar shape of each of the plurality of through holes 21h may be any shape, and is a circular shape, for example. The planar shape of each of the plurality of through holes 21h may be an elliptical shape, for example. It should be noted that the planar shape of outer periphery of photoelectric conversion member 21 is a quadrangular shape, for example, but may be any other shape.

As shown in FIG. 19, the planar shape of each of the plurality of through holes 21h may be a quadrangular shape. The planar shape of each of the plurality of through holes 21h may be a square shape or a rectangular shape. The planar shape of each of the plurality of through holes 21h may be a polygonal shape such as a triangle or a pentagon. The plurality of through holes 21h may have planar shapes different from each other.

Dimensions of the plurality of through holes 21h may be equal to or different from each other. The distance (spacing) between two adjacent through holes 21h may be equal in any of the X direction and the Z direction. Further, the spacing between two adjacent through holes 21h may be changed in any of the X direction and the Z direction. The change in the spacing in any of the X direction and the Z direction may be periodic, but may be non-periodic. Further, the spacing between two adjacent through holes 21h in the X direction may be larger than the spacing between two adjacent through holes 21h in the Z direction. Further, the spacing between two adjacent through holes 21h in the Z direction may be larger than the spacing between two adjacent through holes 21h in the X direction.

As shown in FIG. 20, photoelectric conversion member 21 may be constituted by a plurality of photoelectric conversion member portions 21a disposed to be spaced from each other in the Z direction. Each of the plurality of photoelectric conversion member portions 21a has a linear shape extending along the X direction. As shown in FIG. 20, the widths of the plurality of photoelectric conversion member portions 21a in the Z direction may be equal to or different from each other. Further, the spacing between two adjacent photoelectric conversion member portions 21a in the Z direction may be periodically changed, or may be non-periodically changed, according to the position in the Z direction.

As shown in FIG. 21, photoelectric conversion member 21 may be constituted by the plurality of photoelectric conversion member portions 21a disposed to be spaced from each other in the Z direction, and a plurality of photoelectric conversion member portions 21b disposed in a matrix in each of the X direction and the Z direction. Photoelectric conversion member portion 21a is disposed to connect two adjacent photoelectric conversion member portions 21b. In FIG. 21, photoelectric conversion member portion 21a is disposed to connect two photoelectric conversion member portions 21b adjacent to each other in the X direction. While the plurality of photoelectric conversion member portions

21a and 21b may be formed as the same layer, photoelectric conversion member portion 21b may be disposed to be stacked on a portion of photoelectric conversion member portion 21a, or photoelectric conversion member portion 21a may be disposed to be stacked on a portion of photoelectric conversion member portion 21b.

In photoelectric conversion member 21 shown in FIG. 21, plasmon resonance occurs due to the plurality of photoelectric conversion member portions 21b disposed in a matrix (periodically disposed in two dimensions). Electron-hole pairs produced by photoelectric conversion are excited by this resonance, pass through the plurality of photoelectric conversion member portions 21a periodically disposed in one dimension, and reach electrodes 22 (see FIG. 10). In this manner, photoelectric conversion without polarization dependency occurs, and thus the sensitivity of photoelectric conversion unit 20 is improved.

As described above, since the shape of photoelectric conversion member 21 has a periodic or non-periodic pattern, plasmon resonance determined by the pattern occurs in photoelectric conversion member 21. When the shape of photoelectric conversion member 21 has a periodic pattern, the plasmon resonance has a constant wavelength. On the other hand, when the shape of photoelectric conversion member 21 has a non-periodic pattern, a plurality of resonances occur, and thereby the plasmon resonance has multiple wavelengths. When the spacing between the wavelengths of the plasmon resonance is narrow, electromagnetic waves that can be absorbed by photoelectric conversion member 21 have a wide wavelength. Thus, since the shape of photoelectric conversion member 21 has a periodic or non-periodic pattern, the plasmon resonance occurs, and an absorption rate of electromagnetic waves in photoelectric conversion member 21 is improved. For example, when the material constituting photoelectric conversion member 21 includes graphene, but photoelectric conversion member 21 does not have a periodic or non-periodic pattern, an absorption rate of white light is about 2%, whereas an absorption rate of white light in photoelectric conversion member 21 shown in FIGS. 18 to 21 is improved to up to 100%. As a result, near-field thermal radiation power generation element 1 according to the ninth embodiment has a high sensitivity, because it includes photoelectric conversion member 21 shown in FIGS. 18 to 21.

It should be noted that the wavelength of the plasmon resonance is also affected by a refractive index of a base such as substrate 23 and insulating layer 24. For example, when the material constituting substrate 23 is silicon, in order to allow photoelectric conversion unit 20 including photoelectric conversion member 21 shown in FIG. 20 to detect a mid-infrared wavelength range, it is only necessary that the width of each photoelectric conversion member portion 21a in the Z direction is 200 nm, and the spacing between two photoelectric conversion member portions 21a adjacent in the Z direction is 300 nm. The width of the plurality of photoelectric conversion member portions 21a and the spacing therebetween in the Z direction can be changed as appropriate according to the wavelength to be detected.

<Function and Effect>

In near-field thermal radiation power generation element 1 described above, photoelectric conversion member 21 has a shape in which plasmon resonance occurs. Since the shape of photoelectric conversion member 21 has a periodic or non-periodic pattern, for example, the plasmon resonance occurs, and the absorption rate of electromagnetic waves in photoelectric conversion member 21 is improved.

Tenth Embodiment

<Configuration of Near-Field Thermal Radiation Power Generation Element 1>

Figure 22:
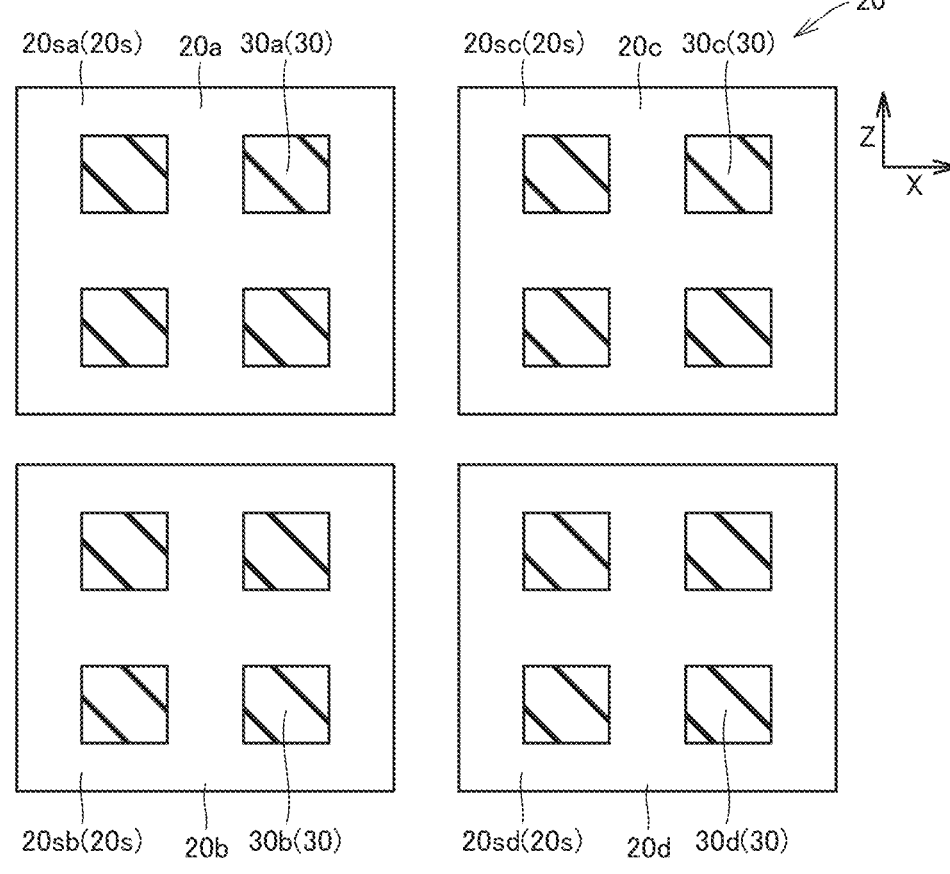
FIG. 22 is a cross sectional view of a near-field thermal radiation power generation element according to a tenth embodiment.

FIG. 22 is a cross sectional view of near-field thermal radiation power generation element 1 according to a tenth embodiment, in plan view as seen from the Y direction. Near-field thermal radiation power generation element 1 shown in FIG. 22 basically has the same configuration as that of near-field thermal radiation power generation element 1 shown in FIGS. 9 and 10, but is different in that it includes a plurality of photoelectric conversion units 20 according to any of the first to ninth embodiments. FIG. 22 is a plan view showing photoelectric conversion unit 20 and stopper 30, as in FIG. 3. Specifically, photoelectric conversion unit 20 is constituted by a first photoelectric conversion unit 20a, a second photoelectric conversion unit 20b, a third photoelectric conversion unit 20c, and a fourth photoelectric conversion unit 20d. Stopper 30 is constituted by a first stopper 30a, a second stopper 30b, a third stopper 30c, and a fourth stopper 30d.

First photoelectric conversion unit 20a has a first photoelectric conversion unit surface 20sa facing heat source surface 10a (see FIG. 9). First stopper 30a connects heat source surface 10a and first photoelectric conversion unit surface 20sa. Second photoelectric conversion unit 20b has a second photoelectric conversion unit surface 20sb facing heat source surface 10a. Second stopper 30b connects heat source surface 10a and second photoelectric conversion unit surface 20sb. Third photoelectric conversion unit 20c has a third photoelectric conversion unit surface 20sc facing heat source surface 10a. Third stopper 30c connects heat source surface 10a and third photoelectric conversion unit surface 20sc. Fourth photoelectric conversion unit 20d has a fourth photoelectric conversion unit surface 20sd facing heat source surface 10a. Fourth stopper 30d connects heat source surface 10a and fourth photoelectric conversion unit surface 20sd. It is only necessary that the number of photoelectric conversion units 20 constituting photoelectric conversion unit 20 is two or more, and, for example, the number of photoelectric conversion units 20 may be four as shown in FIG. 22. The number of stoppers 30 can be changed as appropriate according to the number of photoelectric conversion units 20. For example, when the number of photoelectric conversion units 20 is four, the number of stoppers 30 may be four. It is only necessary that at least one stopper 30 is disposed in each photoelectric conversion unit 20.

As shown in FIG. 22, first to fourth photoelectric conversion units 20a, 20b, 20c and 20d as the plurality of photoelectric conversion units 20 are disposed in a matrix, that is, periodically disposed in the X direction and the Z direction. The plurality of photoelectric conversion units 20 are disposed in an array of two by two. However, the numbers of the plurality of photoelectric conversion units 20 and stoppers 30 and arrangement thereof are not limited thereto. For example, the plurality of photoelectric conversion units 20 may be disposed in an array of three or more by three or more. It is only necessary that the plurality of photoelectric conversion units 20 are disposed with a spacing therebetween, along any of the X direction and the Z direction. Further, the plurality of photoelectric conversion units 20 may be non-periodically disposed, with different spacings therebetween. Wavelength ranges of electromagnetic waves to be detected by the plurality of photoelectric conversion units 20 may be equal to each other. The wavelength ranges of the electromagnetic waves to be detected by the plurality of photoelectric conversion units 20 may be different from each other. That is, the plurality of photoelectric conversion units 20 may have respectively different detection wavelength selectivities. When the plurality of photoelectric conversion units 20 can detect electromagnetic waves in respectively different wavelength ranges, near-field thermal radiation power generation element 1 can detect at least two or more different wavelength components, of the electromagnetic waves radiated from heat source 10. Further, since power can be generated from the plurality of photoelectric conversion units 20, the power generation efficiency of near-field thermal radiation power generation element 1 is improved. The plurality of photoelectric conversion units 20 may be joined to each other by bumps, wires, or the like, which is called a hybrid junction.

<Function and Effect>

In near-field thermal radiation power generation element 1 described above, photoelectric conversion unit 20 includes first photoelectric conversion unit 20a and second photoelectric conversion unit 20b. Stopper 30 includes first stopper 30a and second stopper 30b. Photoelectric conversion unit surface 20s includes first photoelectric conversion unit surface 20sa and second photoelectric conversion unit surface 20sb. First photoelectric conversion unit 20a has first photoelectric conversion unit surface 20sa facing heat source surface 10a. Second photoelectric conversion unit 20b has second photoelectric conversion unit surface 20sb facing heat source surface 10a. First stopper 30a connects heat source surface 10a and first photoelectric conversion unit surface 20sa. Second stopper 30b connects heat source surface 10a and second photoelectric conversion unit surface 20sb. With such a configuration, near-field thermal radiation power generation element 1 can detect at least two or more different wavelength components, of the electromagnetic waves radiated from heat source 10. That is, photoelectric conversion can be performed in the plurality of photoelectric conversion units 20, and thus power generation efficiency is further improved.

It should be understood that the embodiments disclosed herein are illustrative and non-restrictive in every respect. At least two of the embodiments disclosed herein may be combined as long as there is no contradiction. The basic scope of the present disclosure is defined by the scope of the claims, rather than the description above, and is intended to include any modifications within the scope and meaning equivalent to the scope of the claims.

REFERENCE SIGNS LIST

1: near-field thermal radiation power generation element; 10: heat source; 10a: heat source surface; 11: two-dimensional material layer; 20: photoelectric conversion unit; 20a: first photoelectric conversion unit; 20b: second photoelectric conversion unit; 20s: photoelectric conversion unit surface; 20sa: first photoelectric conversion unit surface; 20sb: second photoelectric conversion unit surface; 21: photoelectric conversion member; 21a: photoelectric conversion member portion; 21h: through hole; 21n: N-type region; 21p: P-type region; 22, 221, 22r: electrode; 22a: first electrode surface; 22b: second electrode surface; 23, 33: substrate; 23a: first substrate surface; 23b: second substrate surface; 24: insulating layer; 30: stopper; 30a: first stopper; 30b: second stopper; 40: atomic layer space; t1: first distance; t2: second distance.

The invention claimed is:

1. A near-field thermal radiation power generation element comprising:

a heat source having a heat source surface;

a photoelectric conversion unit having a photoelectric conversion unit surface facing the heat source surface; and a stopper to connect the heat source surface and the photoelectric conversion unit surface, wherein a material for the stopper is a two-dimensional material.

2. The near-field thermal radiation power generation element according to claim 1, wherein the photoelectric conversion unit includes a photoelectric conversion member having the photoelectric conversion unit surface, and a material for the photoelectric conversion member is a two-dimensional material.

3. The near-field thermal radiation power generation element according to claim 2, wherein the photoelectric conversion unit includes a substrate, a pair of electrodes connected with the photoelectric conversion member, and an insulating layer formed between the substrate and the pair of electrodes.

4. The near-field thermal radiation power generation element according to claim 3, wherein a material for the pair of electrodes is a two-dimensional material.

5. The near-field thermal radiation power generation element according to claim 3, wherein the pair of electrodes each have a first electrode surface facing the heat source surface, and a first distance which is a distance from the heat source surface to the photoelectric conversion unit surface is smaller than a second distance which is a distance from the heat source surface to the first electrode surface.

6. The near-field thermal radiation power generation element according to claim 3, wherein the substrate has flexibility.

7. The near-field thermal radiation power generation element according to claim 2, wherein the photoelectric conversion member has a shape in which plasmon resonance occurs.

8. The near-field thermal radiation power generation element according to claim 2, wherein the material for the photoelectric conversion member is any one selected from the group consisting of a single-layer two-dimensional material, a multilayer two-dimensional material, and a turbostratic stacked two-dimensional material.

9. The near-field thermal radiation power generation element according to claim 2, wherein the stopper is connected to only the photoelectric conversion unit surface.

10. The near-field thermal radiation power generation element according to claim 2, wherein the photoelectric conversion member has a PN junction.

11. The near-field thermal radiation power generation element according to claim 1, wherein the photoelectric conversion unit includes a photosensitizer.

12. The near-field thermal radiation power generation element according to claim 1, wherein the material for the stopper is an insulating material.

13. The near-field thermal radiation power generation element according to claim 2, wherein the material for the photoelectric conversion member is graphene, and the material for the stopper is boron nitride.

14. The near-field thermal radiation power generation element according to claim 1, wherein either a through hole or a vacancy is formed in the stopper.

15. The near-field thermal radiation power generation element according to claim 1, wherein the heat source includes a two-dimensional material layer having the heat source surface, and the two-dimensional material layer is made of a two-dimensional material.

16. The near-field thermal radiation power generation element according to claim 1, wherein the photoelectric conversion unit includes a first photoelectric conversion unit and a second photoelectric conversion unit, the stopper includes a first stopper and a second stopper, the photoelectric conversion unit surface includes a first photoelectric conversion unit surface and a second photoelectric conversion unit surface, the first photoelectric conversion unit has the first photoelectric conversion unit surface facing the heat source surface, the second photoelectric conversion unit has the second photoelectric conversion unit surface facing the heat source surface, the first stopper connects the heat source surface and the first photoelectric conversion unit surface, and the second stopper connects the heat source surface and the second photoelectric conversion unit surface.

* * * * *